(12) United States Patent
Hwang

(10) Patent No.: US 10,995,918 B1
(45) Date of Patent: May 4, 2021

(54) OUTDOOR SOLAR LAMP ASSEMBLY STRUCTURE

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 17/140,105

(22) Filed: Jan. 3, 2021

(51) Int. Cl.
| | |
|---|---|
| *F21S 9/03* | (2006.01) |
| *F21V 3/00* | (2015.01) |
| *F21V 17/16* | (2006.01) |
| *F21V 5/00* | (2018.01) |
| *F21Y 115/10* | (2016.01) |
| *F21W 131/00* | (2006.01) |
| *F21W 131/10* | (2006.01) |

(52) U.S. Cl.
CPC ............. *F21S 9/037* (2013.01); *F21V 3/00* (2013.01); *F21V 5/00* (2013.01); *F21V 17/16* (2013.01); *F21W 2131/10* (2013.01); *F21Y 2115/10* (2016.08)

(58) Field of Classification Search
CPC ....... F21S 9/037; F21V 17/14; F21V 21/0824
See application file for complete search history.

(56) References Cited

U.S. PATENT DOCUMENTS

| | | | | |
|---|---|---|---|---|
| 9,273,841 | B2* | 3/2016 | Philhower | F21S 9/037 |
| 10,619,810 | B1 | 4/2020 | Hwang | |
| 2003/0137831 | A1* | 7/2003 | Lin | F21S 8/022 |
| | | | | 362/183 |
| 2005/0281031 | A1* | 12/2005 | Fu | F21S 9/037 |
| | | | | 362/253 |
| 2006/0012996 | A1* | 1/2006 | Tseng | F21S 9/037 |
| | | | | 362/253 |
| 2007/0297167 | A1* | 12/2007 | Greenhoe | F21L 4/08 |
| | | | | 362/183 |
| 2011/0310597 | A1* | 12/2011 | Lu | F21V 5/002 |
| | | | | 362/183 |
| 2014/0218900 | A1* | 8/2014 | Adair | F21S 8/022 |
| | | | | 362/183 |
| 2016/0377247 | A1* | 12/2016 | Chang | F21S 9/037 |
| | | | | 362/158 |

* cited by examiner

*Primary Examiner* — Jong-Suk (James) Lee
*Assistant Examiner* — Eric T Eide

(57) ABSTRACT

An outdoor solar lamp assembly structure includes a base having a receiving slot, a translucent lamp cover covering on the top and outer periphery of the base, and a solar lighting module installed between the base and the translucent lamp cover, and a waterproof design is provided between the translucent lamp cover and the base, and the solar lighting module has a multiple of LED lamps, a solar panel, and a battery integrated and installed onto both front and back sides of a circuit board with a modular design which is conducive to assembly and maintenance.

8 Claims, 5 Drawing Sheets

US 10,995,918 B1

OUTDOOR SOLAR LAMP ASSEMBLY STRUCTURE

FIELD OF THE INVENTION

The present invention relates to an outdoor solar lamp assembly structure, and more particularly to a modular design of the outdoor solar lamp assembly structure that integrates a plurality of LED lamps, a solar panel, and a battery on a circuit board to facilitate assembly and maintenance.

BACKGROUND OF THE INVENTION

In general, outdoor lamps are installed in gardens, neighborhoods, open-air restaurants, outdoor recreational centers, etc. to provide moderate lighting and decoration to the surrounding environment and create atmosphere. Some outdoor lamps are equipped with solar panels which supply solar energy as an operating power and thus have the environmental protection and energy saving effects.

With reference to FIG. 1 for a structure of a conventional outdoor solar lamp, the conventional outdoor solar lamp must come with water-resisting and dust-resisting functions to withstand sunny, rainy and different weather. The conventional outdoor solar lamp as shown in FIG. 1 comprises a base 101, a translucent cover 102 secured to the top of the base 101, and a waterproof gasket 103 installed between the base 101 and the translucent cover 102. A positioning slot 104 is formed at the middle of the base 101 and includes a positioning structure disposed therein for mounting a circuit board 107 with a battery 105 and an LED driver 106 after the battery 105 and the LED driver 106 are installed and positioned.

The top surface of the circuit board 107 has a solar panel 108 and a plurality of LED lamps 109, and the LED lamps 109 and the solar panel 108 are configured to be corresponsive to the bottom of the translucent cover 102, so that the light of the LED lamps 109 can be transmitted out from the translucent cover 102.

In the assembling process of the aforementioned structure, it is necessary to solder and combine the battery 105, the LED driver 106, and the circuit board 107 by a conductive wire, and the positioning slot 104 must be designed as a positioning structure corresponsive to the battery 105 and the LED driver 106 before the battery 105 and the LED driver 106 are installed securely without shaking. After the battery 105 and the LED driver 106 are fixed, the circuit board 107 is mounted above the battery 105 and the LED driver 106, and such assembling process is quite tedious and complicated.

When the circuit board 107 or the battery 105 and the LED driver 106 under the circuit board 107 breaks down, it is necessary to remove the circuit board 107, the battery 105 and the LED driver 106 one by one before replacing the failed component. Similarly, it is necessary to go through the same process for maintenance.

In addition, the base 101 having the screw hole 110 secured to the translucent cover 102 is disposed on the top surface of the translucent cover 102. Although a waterstop structure of the waterproof gasket 103 is installed between the base 101 and the translucent cover 102, moisture still can enter from the screw hole 110 or damage the outdoor lamp easily. Obviously, the prior art requires improvements.

The inventor of the present invention has filed U.S. Pat. No. 10,619,810 entitled "MULTI-PURPOSE SOLAR LAMP" which primarily allows users to conveniently fix the bottom of the solar lamp onto a wall or any plane, or insert the solar lamp into the soil on ground as needed, and the inventor of the present invention aims at the solar lamp assembly and overcomes the issues of complicated assembly and insufficient water resistance of the conventional outdoor solar lamp assembly.

SUMMARY OF THE INVENTION

Specifically, the present invention is directed to an outdoor solar lamp assembly structure, comprising:

a base, having a top surface, a receiving slot concavely formed at the middle of the top surface, a circular ring-shaped wall formed around a peripheral edge of the top surface and extending downwardly from the periphery edge of the top surface, and a ring-shaped positioning edge formed at the outer periphery of the bottom of the ring-shaped wall and outwardly protruding from the outer periphery of the bottom of the ring-shaped wall;

a translucent lamp cover, combined with the top and outer periphery of the base, and having a light transmitting plate covering on the top surface of the base, a ring-shaped side board formed at the outer periphery of the bottom of the light transmitting plate and extending downwardly from the outer periphery of the bottom of the light transmitting plate, and an inner side of the ring-shaped side board surrounding and covering the outer periphery of the ring-shaped wall of the base, and the bottom of the ring-shaped side board abutting and being fixed on the ring-shaped positioning edge;

a waterproof gasket, surrounding and disposed at a joint position of the bottom surface of the light transmitting plate and the inner periphery of the ring-shaped side board, and vertically pressed between the bottom surface of the light transmitting plate and the ring-shaped wall of the base, for preventing external moisture from entering into the top surface and receiving slot of the base; and a solar lighting module, comprising a circuit board having a top surface disposed under the light transmitting plate, and a bottom surface stacked on the top surface of the base and covering on the receiving slot, and the circuit board comprising a plurality of LED lamps, a solar panel, and a battery electrically coupled thereto, wherein the solar panel is fixed onto the top surface of the circuit board and configured to be relative to a position below the center of the light transmitting plate, and the plurality of LED lamps are fixed onto the top surface of the circuit board and disposed around the periphery of the solar panel, and the battery is fixed to the bottom surface of the circuit board bottom surface and embedded into the receiving slot for supplying an operating power to the circuit board and the plurality of LED lamps.

Compared with the prior art, the present invention integrates and installs a plurality of LED lamps, a solar panel, and a battery on a circuit board to form a modular design and facilitate assembly and maintenance, and the invention no longer needs to solder and connect conductive wires among the battery, the LED driver, and the circuit board and then align and combined with the base. In addition, the present invention arranges the solar lighting module between the translucent lamp cover and the base, and there is no seepage structure such as a through hole formed on the surface of the translucent lamp cover, not just maintaining a smooth surface only, but also mounting and covering the whole translucent lamp cover onto the top and outer periphery of the base. In addition, the waterproof gasket is pressed between the light transmitting plate and the base, so that the effect of preventing external moisture from entering and damaging the solar lighting module.

The objectives, technical characteristics and effects of the present invention will become apparent with the detailed description of preferred embodiments accompanied with the illustration of related drawings. It is intended that the embodiments and drawings disclosed herein are to be considered illustrative rather than restrictive.

DESCRIPTION OF THE PREFERRED EMBODIMENTS

Figure 1:
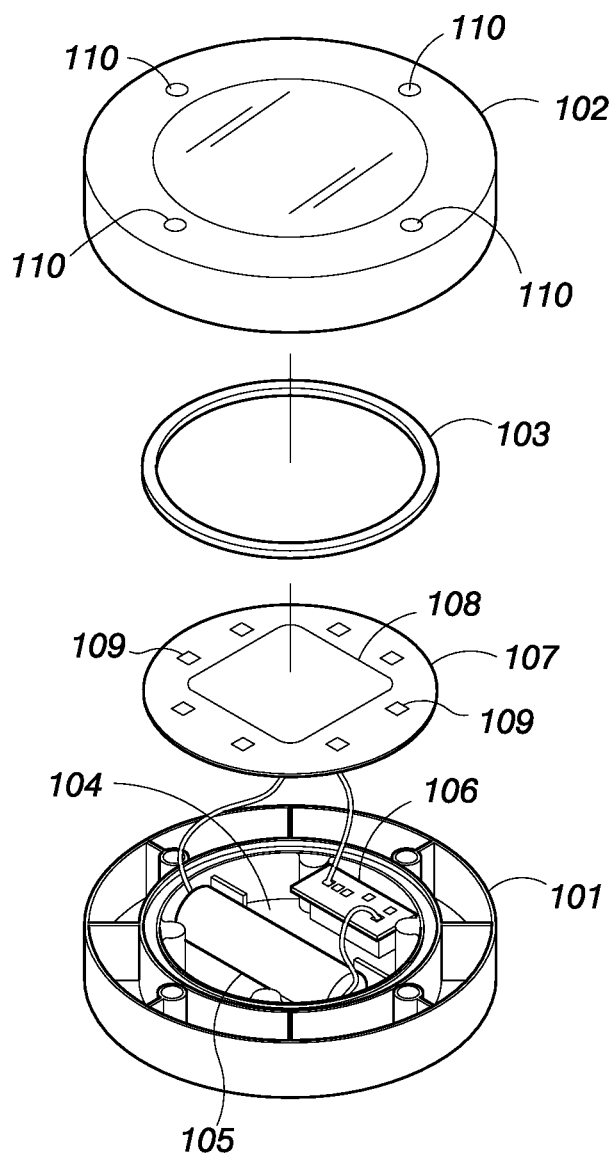
FIG. 1 is an exploded view of a conventional outdoor solar lamp.
Figure 2:
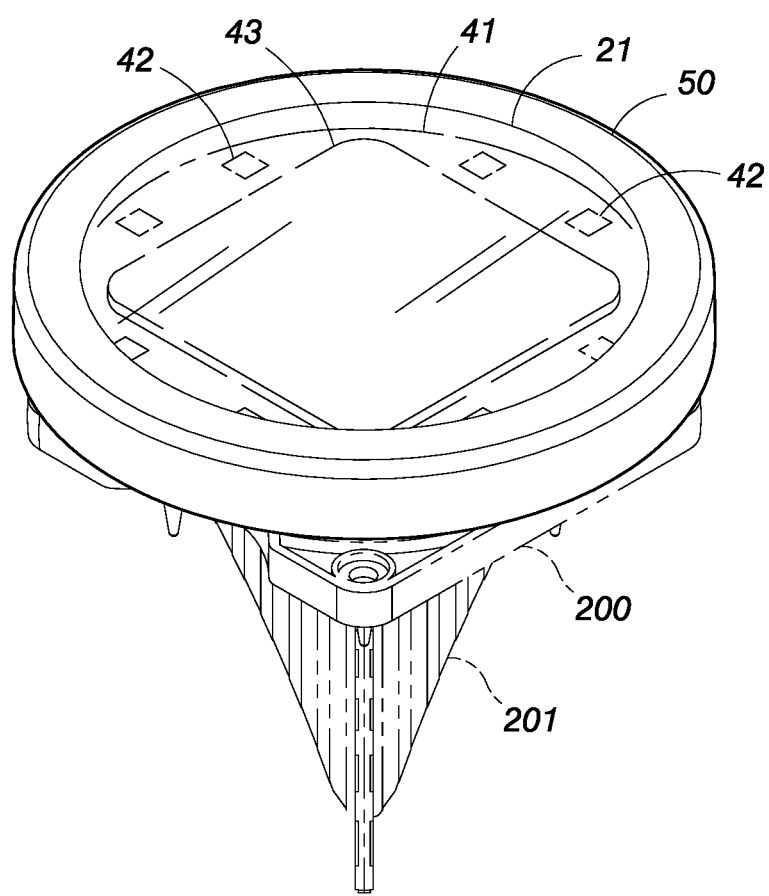
FIG. 2 is a perspective view of the present invention.
Figure 3:
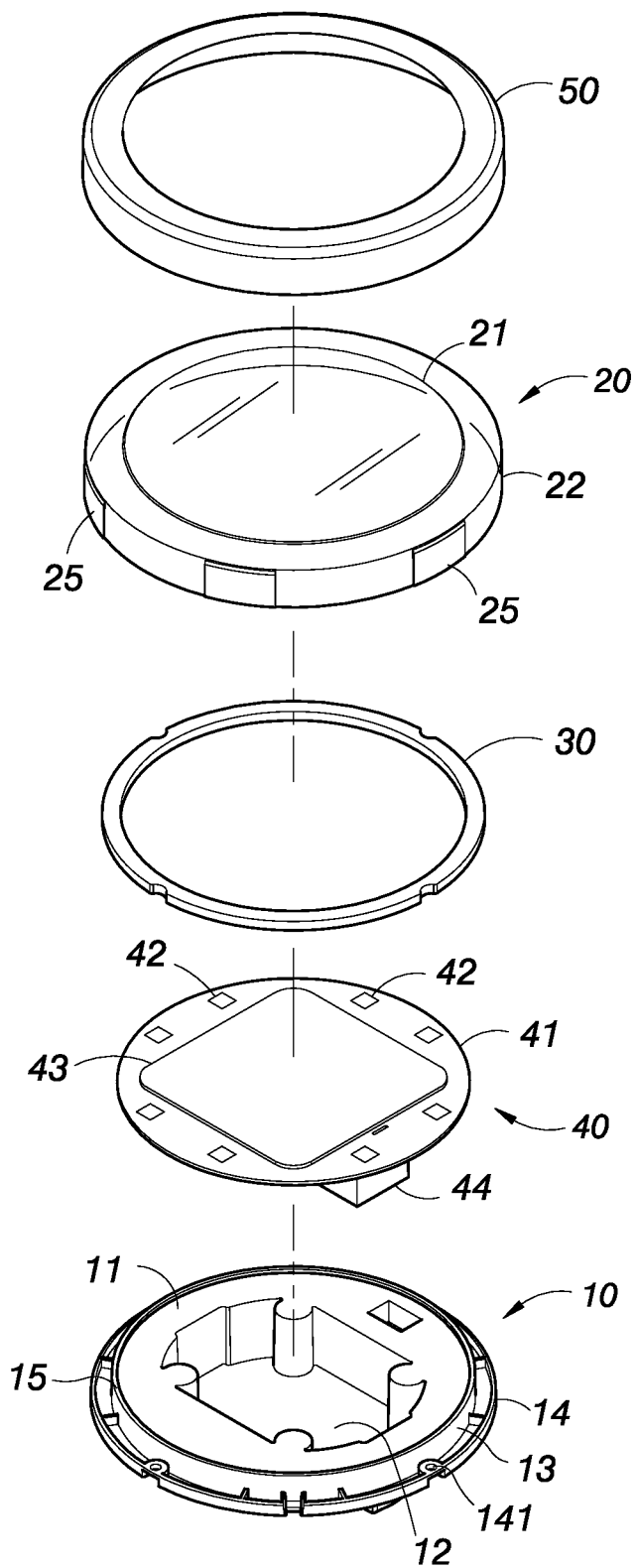
FIG. 3 is an exploded view of the present invention.

With reference to FIGS. 2 and 3 for an outdoor solar lamp assembly structure of the present invention, the outdoor solar lamp assembly structure comprises: a base 10, a translucent lamp cover 20 combined with the top and outer periphery of the base 10, a waterproof gasket 30 and a solar lighting module 40 installed between the base 10 and the translucent lamp cover 20. In an embodiment, the base 10 of the outdoor solar lamp can be assembled with an external positioning plate 200 and a plug-in part 201, so that users can fix the outdoor solar lamp to a wall or any plane or insert the outdoor solar lamp into soil on the ground as needed.

Figure 4:
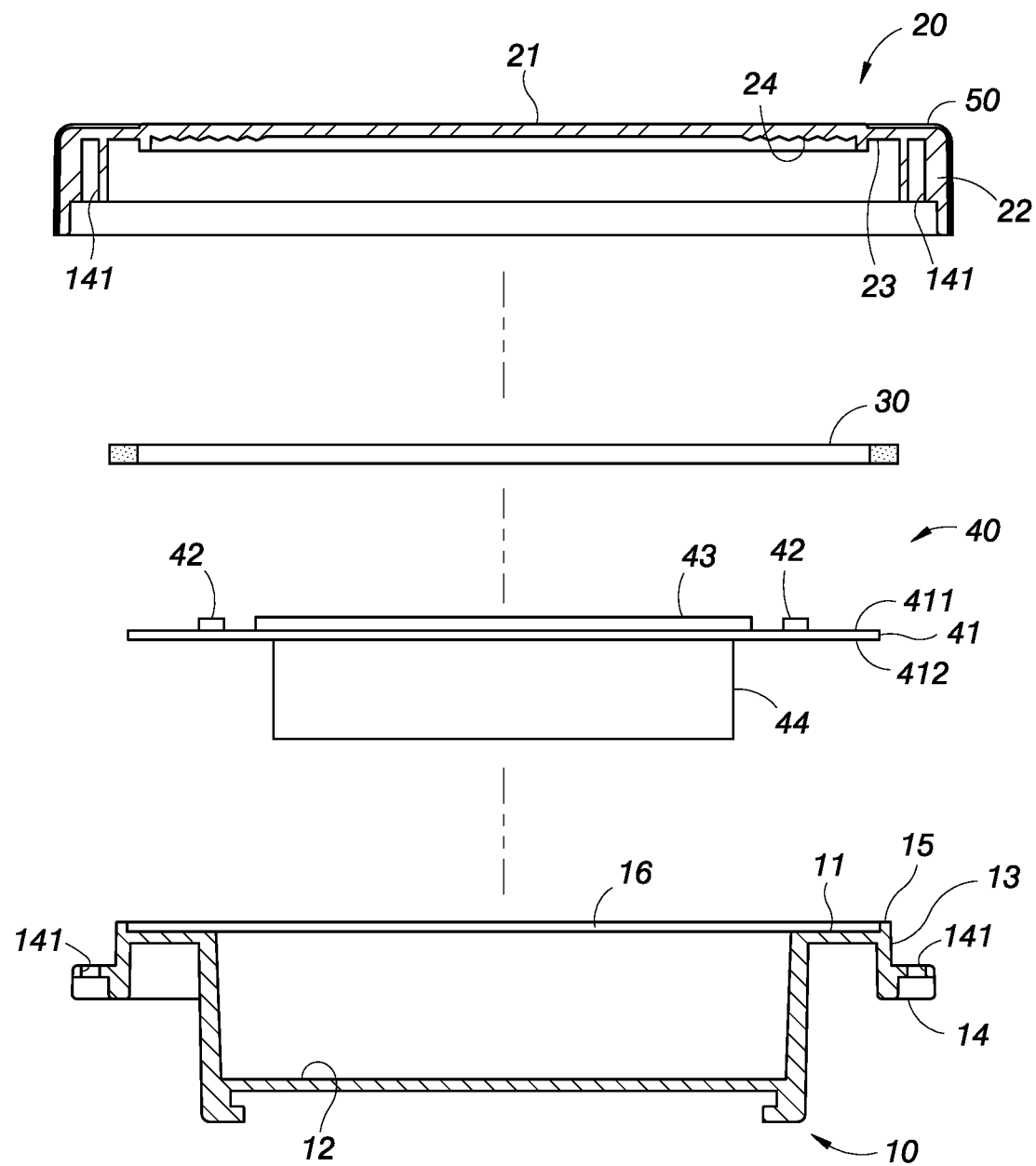
FIG. 4 is an exploded side view of the structure of the present invention.
Figure 5:
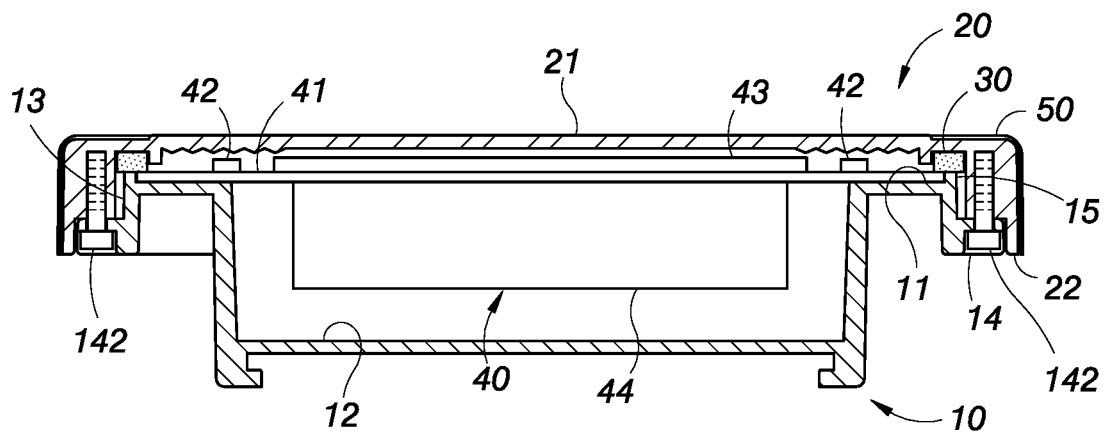
FIG. 5 is a perspective side view of the present invention.

In FIGS. 3-5, the base 10 has a top surface 11, a receiving slot 12 concavely formed at the center of the top surface 11, a circular ring-shaped wall 13 extending downwardly from the peripheral edge of the top surface 11, and a ring-shaped positioning edge 14 protruding outwardly from the outer periphery of the bottom of the ring-shaped wall 13.

The translucent lamp cover 20 has a light transmitting plate 21, and a ring-shaped side board 22 formed and extending downwardly from the outer periphery of the bottom surface of the light transmitting plate 21. During assembling, the light transmitting plate 21 covers onto the top surface 11 of the base 10, and the inner side of the ring-shaped side board 22 surrounds and covers the outer periphery of the ring-shaped wall 13 of the base 10, and the bottom of the ring-shaped side board 22 is pressed and fixed onto the ring-shaped positioning edge 14. In an embodiment, the ring-shaped side board 22 and the ring-shaped positioning edge 14 have plurality of corresponding screw holes 141 for securing a plurality of external screws 142 into the corresponding screw holes 141 of the ring-shaped side board 22 from top to bottom of the screw holes 141 of the ring-shaped positioning edge 14 respectively, so as to fix the base 10 with the translucent lamp cover 20.

The waterproof gasket 30 is installed around the junction of the bottom surface of the light transmitting plate 21 and the inner periphery of the ring-shaped side board 22, and vertically pressed between the bottom surface of the light transmitting plate 21 and the top of the ring-shaped wall 13 of the base 10, so that the base 10 and the translucent lamp cover 20 are sealed tightly with each other after the assembling, so as to prevent external moisture from entering from the top surface 11 of the base 10 and prevent the solar lighting module 40 from being damaged by the moisture.

In an embodiment, a protruding ring 15 is formed and protruded upwardly from the outer periphery of the ring-shaped wall 13 of the base 10 and around the periphery of the top surface 11 of the base 10, so that an accommodation space 16 is formed between the top surface 11 of the base 10 and the inner periphery of the protruding ring 15. The light transmitting plate 21 has a ring-shaped groove 23 formed at the bottom surface of the light transmitting plate 21 and configured to be corresponsive to the protruding ring 15 of the base 10, and the waterproof gasket 30 is installed in the ring-shaped groove 23 and the bottom of the waterproof gasket 30 is pressed on the top of the protruding ring 15 to strengthen the waterproof function.

The solar lighting module 40 comprises a circuit board 41, a plurality of LED lamps 42, a solar panel 43, and a battery 44 stacked and positioned in the accommodation space 16 of the base 10. Wherein, the circuit board 41 has a top surface 411 disposed under the light transmitting plate 21, and a bottom surface 412 stacked with the top surface 11 of the base 10 and covered onto the receiving slot 12.

The solar panel 43 is fixed onto the top surface 411 of the circuit board 41, and configured to be corresponsive to a position under the center of the light transmitting plate 21 to facilitate the solar panel 43 to collect light.

The plurality of LED lamps 42 are fixed to the top surface 411 of the circuit board 41 and disposed around the periphery of the solar panel 43, and an emboss-deboss pattern 24 is densely distributed on the bottom surface of the light transmitting plate 21 and configured to be corresponsive to the plurality of LED lamps 42, so that the light emitted from the LED lamp 42 can be passed through the emboss-deboss pattern 24 and scattered uniformly.

The battery 44 is fixed to the bottom surface 412 of the circuit board 41 and embedded into the receiving slot 12 for supplying operating power to the circuit board 41 and the plurality of LED lamps 42.

In an embodiment, it is advisable to design the contour of the outer periphery of the circuit board 41 to be substantially the same as the contour of the inner periphery of the protruding ring 15 of the base 10, so that when the circuit board 41 is stacked and positioned in the accommodation space 16, the outer periphery of the circuit board 41 can be snapped on the inner periphery of the protruding ring 15 to achieve the position limiting function and prevent the circuit board 41 from shaking horizontally in the accommodation space 16.

In addition, the bottom of the waterproof gasket 30 of this embodiment has a width greater than the width of the cross section of the protruding ring 15, and the circuit board 41 has a thickness substantially equal to the height of the protruding ring 15 protruded from the top surface 11 of the base 10, so that when the translucent lamp cover 20 is assembled with the base 10, and the bottom of the waterproof gasket 30 is pressed on the top of the protruding ring 15, the inner periphery of the bottom of the waterproof gasket 30 is pressed on the top of the outer periphery of the circuit board 41 at the same time, so that the circuit board 41 will not be shaken up and down.

Figure 6:
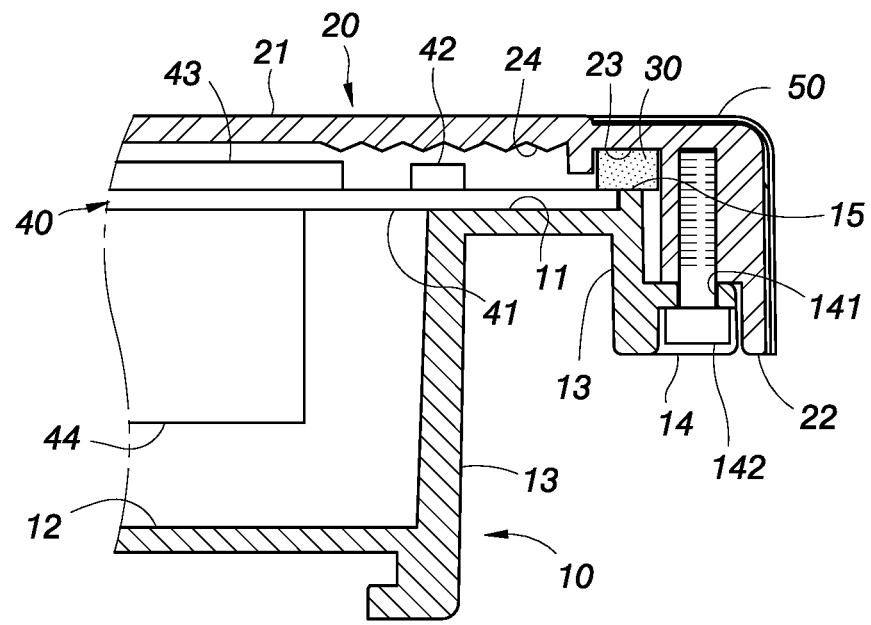
FIG. 6 is a partial blowup view of FIG. 5.

In FIGS. 4-6, since the LED lamp 42, the solar panel 43 and the battery 44 are integrated and installed on the circuit board 41 to form a modular design of the assembly, and the positioning design including the receiving slot 12, the protruding ring 15, and the accommodation space 16 configured to be corresponsive to the top surface 11 of the base 10, the users just need to put the solar lighting module 40 on the base 10 and then cover the translucent lamp cover 20 from top to bottom onto the solar lighting module 40 and the base 10, and secure the external screw 142 from each screw hole 141 of the ring-shaped positioning edge 14 in a bottom-up direction into the screw hole 141 formed on the bottom of the ring-shaped side board 22, so that the translucent lamp cover 20 can be fixed to the base 10 to complete the assembling conveniently and save assembling time.

In actual use, the circuit board 41 of the solar lighting module 40 is positioned in the accommodation space 16 at the inner periphery of the protruding ring 15 to prevent sideway shaking, and the bottom of the waterproof gasket 30 is pressed tightly on the protruding ring 15 and the top of the outer periphery of the circuit board 41, and such arrangement not just can achieve the expected waterproof effect only, but also can prevent the circuit board 41 from shaking up and down, so that the whole solar lighting module 40 can be securely fixed and sealed between the translucent lamp cover 20 and the base 10.

When any one of the components including the circuit board 41, the LED lamp 42, the solar panel 43, and the battery 44 needs to be repaired due to long-term use, it simply needs to remove the external screw 142 and take out the translucent lamp cover 20 in order to replace the solar lighting module 40 without requiring the removal and re-installation of the electronic components one by one. Therefore, both installation and maintenance are very convenient.

Compared with the prior art, the solar lighting module 40 of the present invention uses the structures such as the accommodation space 16, the receiving slot 12, and the protruding ring 15 of the base 10 for quick positioning and the connection between the translucent lamp cover 20 and the base 10 to fix the waterproof gasket 30 and also installing the circuit board 41 of the solar lighting module 40 at the same time quickly by pressing and positioning the waterproof gasket 30.

In addition, there is no seepage structure such as a through hole or screw hole on the surface of the translucent lamp cover 20, so that the surface is maintained smooth, and the whole translucent lamp cover 20 is mounted and covered onto the top and outer periphery of the base 10. Further, the waterproof gasket 30 is pressed between the light transmitting plate 21 and the base 10 to prevent external moisture from entering or damaging the solar lighting module 40.

In addition, the translucent lamp cover 20 further comprises a rim 50 covering the outer periphery of the junction of the transmitting plate 21 and the ring-shaped side board 22, and the rim 50 is made of metal to prevent the outdoor solar lamp from being collided or damaged, so as to extend service life. Further, a snap-on portion 25 (as shown in FIG. 3) of spaced and protruded from an outer side of the ring-shaped side board 22 of the translucent lamp cover 20 for engaging and positioning the inner periphery of the rim 50 and preventing the rim 50 from falling off easily.

While the invention has been described by means of specific embodiments, numerous modifications and variations could be made thereto by those skilled in the art without departing from the scope and spirit of the invention as set forth in the claims.

What is claimed is:

1. An outdoor solar lamp assembly structure, comprising:
a base, having a top surface, a receiving slot concavely formed at the middle of the top surface, a circular ring-shaped wall formed around a peripheral edge of the top surface and extending downwardly from the periphery edge of the top surface, and a ring-shaped positioning edge formed at the outer periphery of the bottom of the ring-shaped wall and outwardly protruding from the outer periphery of the bottom of the ring-shaped wall;
a translucent lamp cover, combined with the top and outer periphery of the base, and having a light transmitting plate covering on the top surface of the base, a ring-shaped side board formed at the outer periphery of the bottom of the light transmitting plate and extending downwardly from the outer periphery of the bottom of the light transmitting plate, and an inner side of the ring-shaped side board surrounding and covering the outer periphery of the ring-shaped wall of the base, and the bottom of the ring-shaped side board abutting and being fixed on the ring-shaped positioning edge;
a waterproof gasket, surrounding and disposed at a joint position of the bottom surface of the light transmitting plate and the inner periphery of the ring-shaped side board, and vertically pressed between the bottom surface of the light transmitting plate and the ring-shaped wall of the base, for preventing external moisture from entering into the top surface and receiving slot of the base; and
a solar lighting module, comprising a circuit board having a top surface disposed under the light transmitting plate, and a bottom surface stacked on the top surface of the base and covering on the receiving slot, and the circuit board comprising a plurality of LED lamps, a solar panel, and a battery electrically coupled thereto, wherein the solar panel is fixed onto the top surface of the circuit board and configured to be relative to a position below the center of the light transmitting plate, and the plurality of LED lamps are fixed onto the top surface of the circuit board and disposed around the periphery of the solar panel, and the battery is fixed to the bottom surface of the circuit board bottom surface and embedded into the receiving slot for supplying an operating power to the circuit board and the plurality of LED lamps;
wherein the top of the ring-shaped wall of the base is extended and protruded upwardly to form a protruding ring surrounding and extending upwardly from the outer periphery of the top surface of the base, and the bottom surface of the light transmitting plate has a ring-shaped groove configured to be corresponsive to the protruding ring of the base, and the waterproof gasket is installed in the ring-shaped groove and the bottom of the waterproof gasket presses at the top of the protruding ring.

2. The outdoor solar lamp assembly structure as claimed in claim 1, wherein the protruding ring is protruded from the top surface of the base with a height substantially equal to the thickness of the circuit board, so that an accommodation space is formed between the top surface of the base and the inner periphery of the protruding ring for stacking and positioning the circuit board.

3. The outdoor solar lamp assembly structure as claimed in claim 2, wherein the outer periphery of the circuit board has a contour substantially the same as the contour of the inner periphery of the protruding ring of the base, so that when the circuit board is stacked and positioned in the accommodation space, the outer periphery of the circuit board is snapped on the inner periphery of the protruding ring.

4. The outdoor solar lamp assembly structure as claimed in claim 3, wherein the bottom surface of the waterproof gasket has a width greater than the width of the cross section of the protruding ring, and when the bottom of the waterproof gasket presses at the top of the protruding ring, the inner periphery of the bottom of the waterproof gasket bottom is pressed at the top of the outer periphery of the circuit board simultaneously.

5. The outdoor solar lamp assembly structure as claimed in claim 4, wherein the bottom of the ring-shaped side board of the translucent lamp cover, and the ring-shaped positioning edge of the base have a plurality of corresponding screw holes for securing a plurality of external screws from the screw holes of the ring-shaped positioning edge into the corresponding screw holes relative to the bottom of the ring-shaped side board bottom respectively, so that the bottom of the waterproof gasket of the translucent lamp cover can be pressed closely at the protruding ring and the top of the outer periphery of the circuit board.

6. The outdoor solar lamp assembly structure as claimed in claim 1, wherein the bottom surface of the light transmitting plate is densely distributed with a plurality of emboss-deboss patterns, so that the light emitted by the LED lamps can be scattered.

7. The outdoor solar lamp assembly structure as claimed in claim 1, wherein the translucent lamp cover further comprises a rim for covering a joint position of the light transmitting plate and the outer periphery of the ring-shaped side board.

8. The outdoor solar lamp assembly structure as claimed in claim 7, wherein the ring-shaped side board of the translucent lamp cover has a plurality of snap-on portions spaced from each other and protruded from an outer side of the ring-shaped side board of the translucent lamp cover, and the snap-on portions are snapped on and fixed to the inner periphery of the rim.

\* \* \* \* \*